Patented Jan. 28, 1941

2,230,167

UNITED STATES PATENT OFFICE 2,230,167

METHOD OF RECOVERING LITHIUM SALTS FROM LITHIUM-CONTAINING MINERALS

Karl Arne Sivander, Riddersviks Gard, Hasselby Villastad, and Sven Johan Walldén, Stockholm, Sweden, assignors to Bolidens Gruvaktiebolag, Stockholm, Sweden, a joint-stock company, limited, of Sweden No Drawing. Application November 14, 1938, Serial No. 240,416. In Sweden December 6, 1937

6 Claims. (Cl. 23—27)

The present invention relates to a novel method of recovering lithium salts from lithium minerals. A characteristic feature of the invention consists therein that the rock is treated with an alkali sulphate, an exchange of ions then taking place so that metallic ions from the salt melt migrate into the rock, replacing lithium ions combined therein, while at the same time lithium ions from the rock migrate into the melt which is then treated to recover them.

It is known that, in the recovery of lithium salts from silicate-containing lithium minerals, alkali salts may be used to extract them. The reaction is a pure exchange of ions. The alkali ions of the decomposition salt are simply exchanged for the lithium ions of the mineral. The silica skeleton of the mineral is not attacked. Hitherto it has not been possible to carry out this process at a higher temperature than 850° C. At higher temperatures the mineral has slagged, resulting in low yields. Thus, the reaction had to take place between two solid phases, and this involves low rapidities of reaction. Due to slagging, it has hitherto also been impossible to employ solely the cheap sodium sulphate for the decomposition. In order to prevent slagging it has been necessary to employ potassium sulphate or else sodium sulphate, to which certain ingredients, such as potassium or calcium sulphate, have been added.

By experiments the inventors have discovered an improved process for recovering lithium salts from silicate-containing minerals, such as lepidolite, petalite and spodumene, which is superior to prior processes. According to the present invention, the process is carried out at temperatures higher than the melting point of the alkali sulphates but lower than the temperature at which the silica skeleton of the minerals is demolished, preferably at 850 to 1200° C., and in an atmosphere incapable of reducing the alkali sulphate employed.

The inventors have proved that the slagging of the material, which has occurred when the temperature, in the use of earlier methods, was allowed to exceed 850° C., is due to the fact that a minor portion of the alkali sulphate employed was reduced to alkali sulphides or alkali sulphites. It has been proved that even a few tenths of a per cent of suphide or sulphite slags the material and that the process is impracticable in case of a content of about two per cent of sulphide or sulphite. This observation made by the inventors of the present method has rendered possible an adjustment of the reaction conditions in such a manner that the treatment of the mineral may take place at essentially higher temperatures than heretofore, and at the same time it is made possible to employ pure sodium sulphate as the extracting means.

In order that the furnace atmosphere, according to the foregoing, may attain the appropriate composition, furnaces especially adapted to the purpose should be employed. Electric resistance furnaces have been found satisfactory. If furnaces fired by fuel are employed, well designed burners must be used, so located that the flame does not come into direct contact with the sulphate melt. However, the invention is not confined to any special furnace design.

The advantages obtained by the novel method are principally as follows:

1. The mineral is treated in solid condition with an extractant in a state of fusion. By this, there is obtained, as compared with prior art processes, a higher rate of reaction which is further increased by the high reaction temperature employed. For this reason, it is possible to work with mineral particles of larger size, and thus reduce the cost of crushing. At a temperature of 1000° C. it is possible to extract in ten minutes 90 per cent of the lithium content of spodumene grains having a size of one millimetre (in longitudinal section). Due to this high rate of reaction it is possible to employ comparatively small reaction furnaces, resulting in a good heat economy and low costs.

2. It has also proved possible simply to wash out the lithium content of the mineral. The washing-out may, for example, be so arranged that molten sodium sulphate is allowed to flow through a layer of coarsely crushed mineral, and as a result it brings along with it the lithium content of the mineral. It is to be desired that the lithium content of the sodium sulphate be as high as possible. Between the lithium content of the mineral and that of the sulphate there exists, however, a certain equilibrium. Therefore, the lithium content of the sulphate cannot rise higher than to a percentage corresponding to that of the original mineral. However, the maximum content may be obtained by making the mineral layer sufficiently high (thick) so that outgoing sulphate finally always passes through non-decomposed mineral. The process may also be established in such a manner that the mineral is extracted by a series of sulphate melts and is continually carried from a melt having a higher lithium content to a melt with a lower content. It is evident that such a process requires that the melt should easily flow off from the solid grains. This flowing-off is facilitated if the grains are of larger size and if the temperature is increased. By this process there is obtained, also with the use of small amounts of extractant, a good yield of lithium, which by repeated extracants, may be increased to 100 per cent.

3. The process makes it possible to carry out the reaction while using pure sodium sulphate, which means that the cost of the process is reduced.

Sodium sulphate is the salt which is the most suitable one for this reaction. In the first place it has a low melting point. Whereas with the use of potassium sulphate, for example, temperatures above 1070° C. must be employed, i. e. temperatures in the vicinity of the temperature at which the silica skeleton is demolished by using sodium sulphate, it is possible to work at a safe temperature distance therefrom. Moreover, sodium sulphate is the cheapest alkali sulphate. Sodium sulphate also offers considerable advantages with regard to the further recovery of lithium salts from the reaction mixture. For example, the sodium sulphate has a high solubility in water, it thus being possible to dissolve the sulphate melt in a small quantity of water. Only small quantities of water must be evaporated, and the cost of evaporation becomes comparatively low. Furthermore, in precipitating lithium carbonate from the lithium sulphate solution inexpensive soda may be used, whereas, with the use of potassium sulphate the precipitation must be effected by means of relatively expensive potash.

The process above described is especially suitable for petalite and spodumene which, according to heretofore known processes, are very difficult to work up, on account of the fact that the lithium ions are comparatively firmly linked to the mineral skeleton.

Having thus described our invention we declare that what we claim is:

1. A process for the recovery of lithium salts from silicate rocks containing lithium which comprises extracting said rock with molten alkali metal sulphate selected from the class consisting of sodium and potassium sulphates in an atmosphere non-reducing to said sulphate at a temperature not substantially less than 850° C. and above the melting point of said sulphate, while maintaining said rock in the solid state; and separating molten sulphate containing lithium from the solid residue.

2. A process as claimed in claim 1, characterised in that the furnace atmosphere adjacent the melt is oxidising, i. e. contains an excess of oxygen but no unburnt matter.

3. A process as claimed in claim 1, characterised in that the temperature of reaction is 850 to 1200° C.

4. A process as claimed in claim 1, characterised in that the alkali sulphate consists of sodium sulphate.

5. A process as claimed in claim 1, characterized in that a high lithium content in the alkali-sulphate melt and at the same time an almost complete extracting of lithium from the mineral ore is obtained by treating the mineral in several stages successively with sulphate melts of lower lithium concentration, in such a manner, that the raw material is treated with a melt of high concentration and the mineral free from lithium is treated with alkalisulphate free from lithium.

6. A process as claimed in claim 1, characterised in that the melt is allowed to flow through a layer of crushed mineral.

KARL ARNE SIVANDER.
SVEN JOHAN WALLDÉN.